US010668960B1

(12) United States Patent
Morrison, Sr.

(10) Patent No.: US 10,668,960 B1
(45) Date of Patent: Jun. 2, 2020

(54) PLOW CONVERSION KIT

(71) Applicant: Richard A. Morrison, Sr., Wilmington, DE (US)

(72) Inventor: Richard A. Morrison, Sr., Wilmington, DE (US)

( * ) Notice: Subject to any disclaimer, the term of this patent is extended or adjusted under 35 U.S.C. 154(b) by 0 days.

(21) Appl. No.: 16/176,544

(22) Filed: Oct. 31, 2018

Related U.S. Application Data

(63) Continuation-in-part of application No. 15/800,246, filed on Nov. 1, 2017, now Pat. No. 10,179,986.

(51) Int. Cl.
| | |
|---|---|
| *E02F 3/627* | (2006.01) |
| *B62D 49/06* | (2006.01) |
| *E01H 5/06* | (2006.01) |
| *B62D 49/04* | (2006.01) |
| *E02F 3/36* | (2006.01) |

(52) U.S. Cl.
CPC ........... *B62D 49/065* (2013.01); *B62D 49/04* (2013.01); *E01H 5/061* (2013.01); *E02F 3/3663* (2013.01)

(58) Field of Classification Search
CPC ...... B62D 49/065; B62D 49/04; E01H 5/061; E02F 3/3663; E02F 3/4133; E02F 9/2203; A01B 59/064
See application file for complete search history.

(56) References Cited

U.S. PATENT DOCUMENTS

| | | | | |
|---|---|---|---|---|
| 2,061,585 A | * | 11/1936 | Meyer | E01H 1/105 15/245 |
| 4,803,790 A | * | 2/1989 | Ciula | E01H 5/06 172/701.1 |
| 6,257,347 B1 | * | 7/2001 | Campisi | A01B 59/068 172/439 |
| 8,684,623 B2 | * | 4/2014 | Robl | F16D 1/00 37/468 |
| 2014/0109445 A1 | * | 4/2014 | Warchola | E01H 5/061 37/231 |

* cited by examiner

*Primary Examiner* — Michael S Lowe
(74) *Attorney, Agent, or Firm* — Joseph E. Maenner; Petock & Petock LLC

(57) ABSTRACT

A plow conversion kit includes a frame having a pivot plate configured to attach to a vehicle and a frame pivotally attached to the pivot plate. A first actuator is attached to the frame. A pivot bracket is directly pivotally attached to the frame at a first pivot and to the first actuator at a second pivot. A mounting bracket is directly pivotally attached to the frame such that the mounting bracket is adapted to releasably attach to a work piece. A mount arm is directly pivotally attached to the mounting bracket and to the pivot bracket at a third pivot.

20 Claims, 16 Drawing Sheets

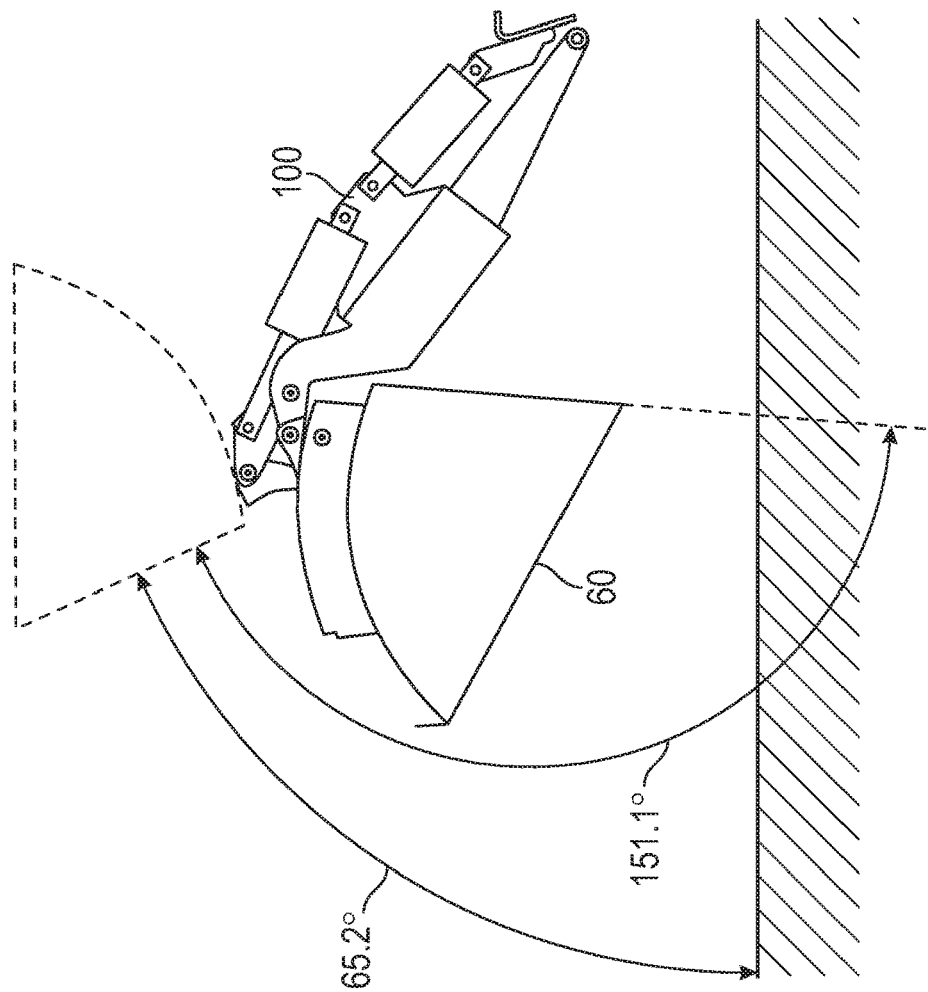
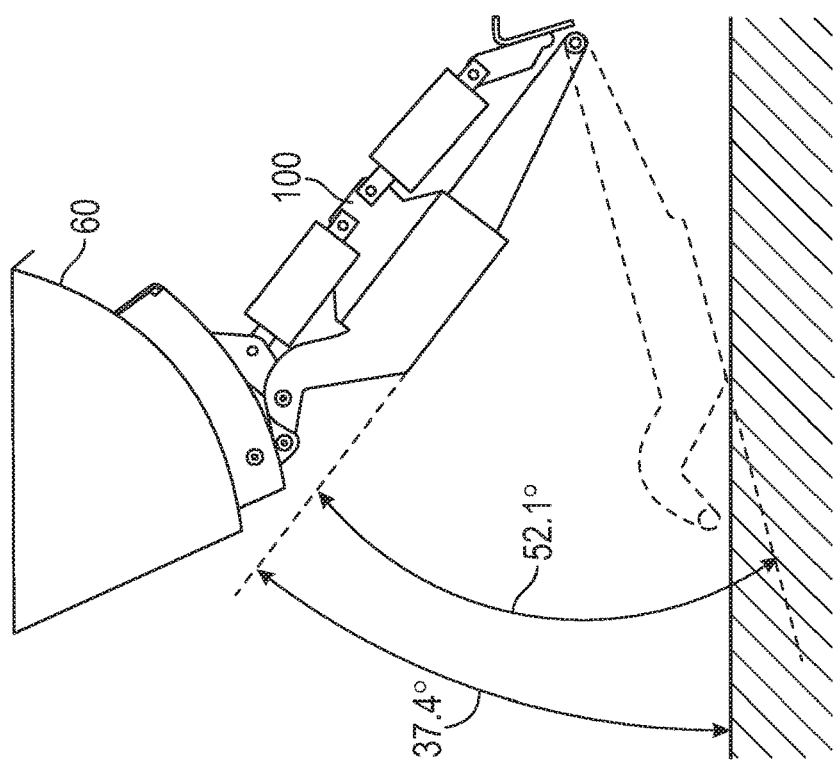
FIG. 6B
FIG. 6A

PLOW CONVERSION KIT

CROSS-REFERENCE TO RELATED APPLICATION

The present application is a Continuation-in-Part Application of U.S. patent application Ser. No. 15/800,246, filed on Nov. 1, 2017, which is incorporated herein by reference in its entirety.

BACKGROUND OF THE INVENTION

Field of the Invention

The present invention relates to a plow conversion kit that can be releasably attached to the front end of a tractor to provide a greater range of motion than is provided with originally provided equipment.

Description of the Related Art

Yard tractors are often provided with interchangeable tools that are mounted on a movable frame. The tool and the frame are hydraulically activated via hydraulic cylinders mounted on the frame and operated from a driver sitting on the tractor. Numerous replacement frames, or "conversion kits" are available that provide different features.

It would be beneficial to provide a conversion kit that has a greater range of motion than any existing frames or conversion kits.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a plow conversion kit for a tractor. The kit includes a frame having a frame proximal end, a frame distal end, and a top surface extending between the proximal end and the distal end. The proximal end is configured to slidingly connect to a tractor bracket. A fixed bracket is fixed to the top surface of the frame. The fixed bracket has a fixed bracket proximal end and a fixed bracket distal end. A first hydraulic cylinder has a first cylinder proximal end pivotally connected to the fixed bracket at a first pivot and a first cylinder distal end extending distally of the fixed bracket. A mounting bracket is adapted to releasably attach to a work piece. The mounting bracket has a lower end pivotally connected to the fixed bracket distal end at a second pivot. A mount arm has a lower end pivotally connected to the mounting bracket at a third pivot above the second pivot. A pivot bracket has a lower end pivotally connected to the frame distal end at a fourth pivot, a central portion pivotally connected to the cylinder distal end at a fifth pivot, and a top end connectable to an upper portion of the mount arm at a sixth pivot.

In an alternative embodiment, a plow conversion kit comprises a frame, a first hydraulic cylinder attached to the frame, and a pivot bracket pivotally attached to the frame and to the first hydraulic cylinder. A mounting bracket is pivotally attached to the frame such that the mounting bracket adapted to releasably attach to a work piece and a mount arm is pivotally attached to the mounting bracket and to the pivot bracket.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 6A is a side elevational view of the plow conversion kit shown in FIG. 2, with the work piece attached, showing the range of motion of the kit;

FIG. 6B is a side elevational view of the plow conversion kit shown in FIG. 2, with the work piece attached, showing the range of motion of the work piece;

DETAILED DESCRIPTION

Figure 1:
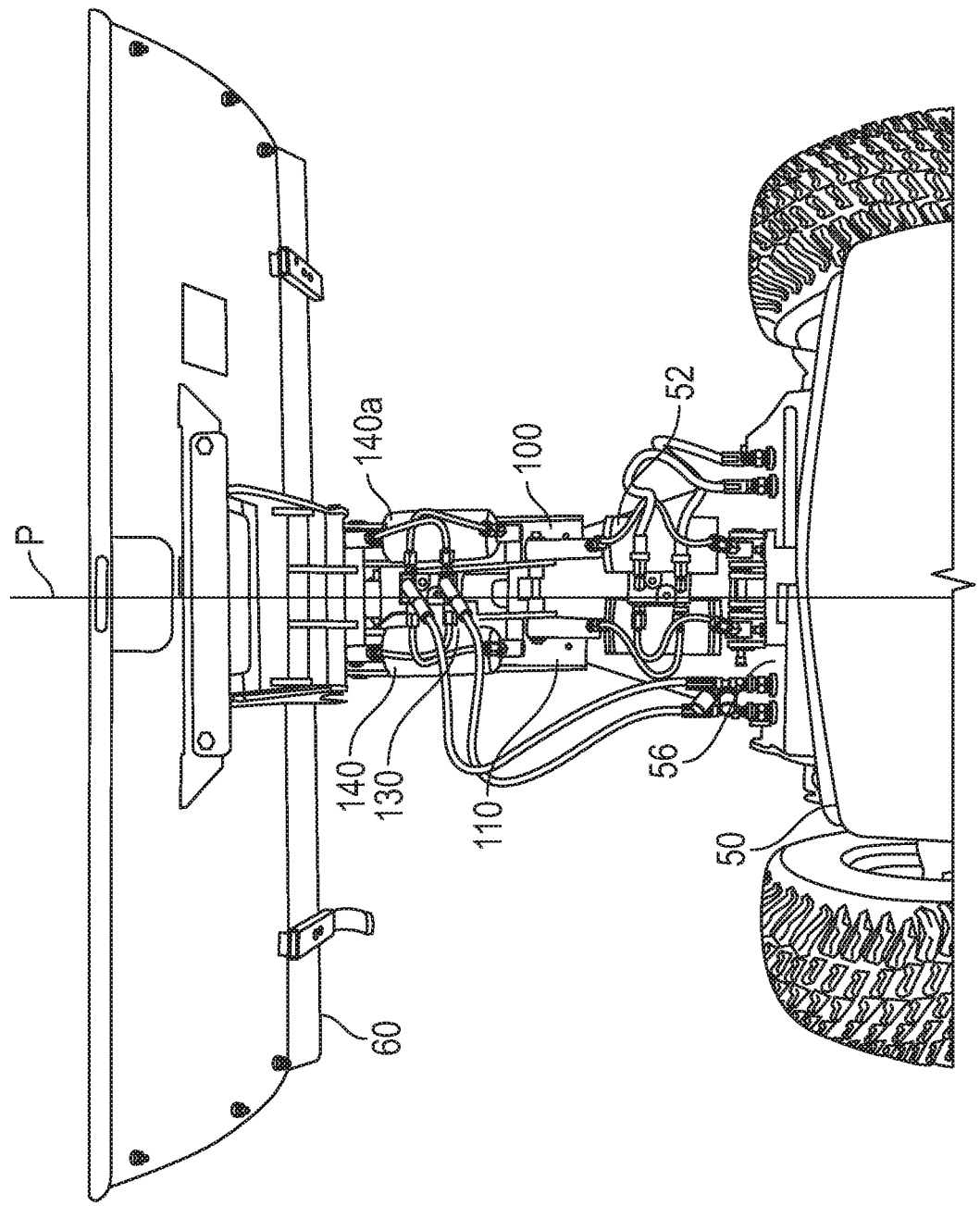
FIG. 1 is a top plan view of a plow conversion kit according to a first exemplary embodiment of the present invention mounted on a tractor, with a work piece.

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "proximal" is intended to mean a direction closer to a driver of a tractor utilizing the inventive kit and "distal" is intended to mean a direction farther from the driver.

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

A tractor 50, shown in FIG. 1, allows for multiple different types of work pieces 60 to be mounted on a front end thereof. Work piece 60 can be a plow, a bucket/scoop, forks, or other known work pieces that can be operated by tractor 50. While tractor 50 is shown, those skilled in the art will recognize that vehicles other than tractors, such as utility vehicles, all-terrain vehicles, or other vehicles can be used with the present invention. While the present application discusses the attachment of work piece 60 to the front of tractor 50, those skilled in the art will recognize that work piece 60 can be attached to other parts of tractor 50, such as, for example, at the rear of tractor 50.

Figure 2:
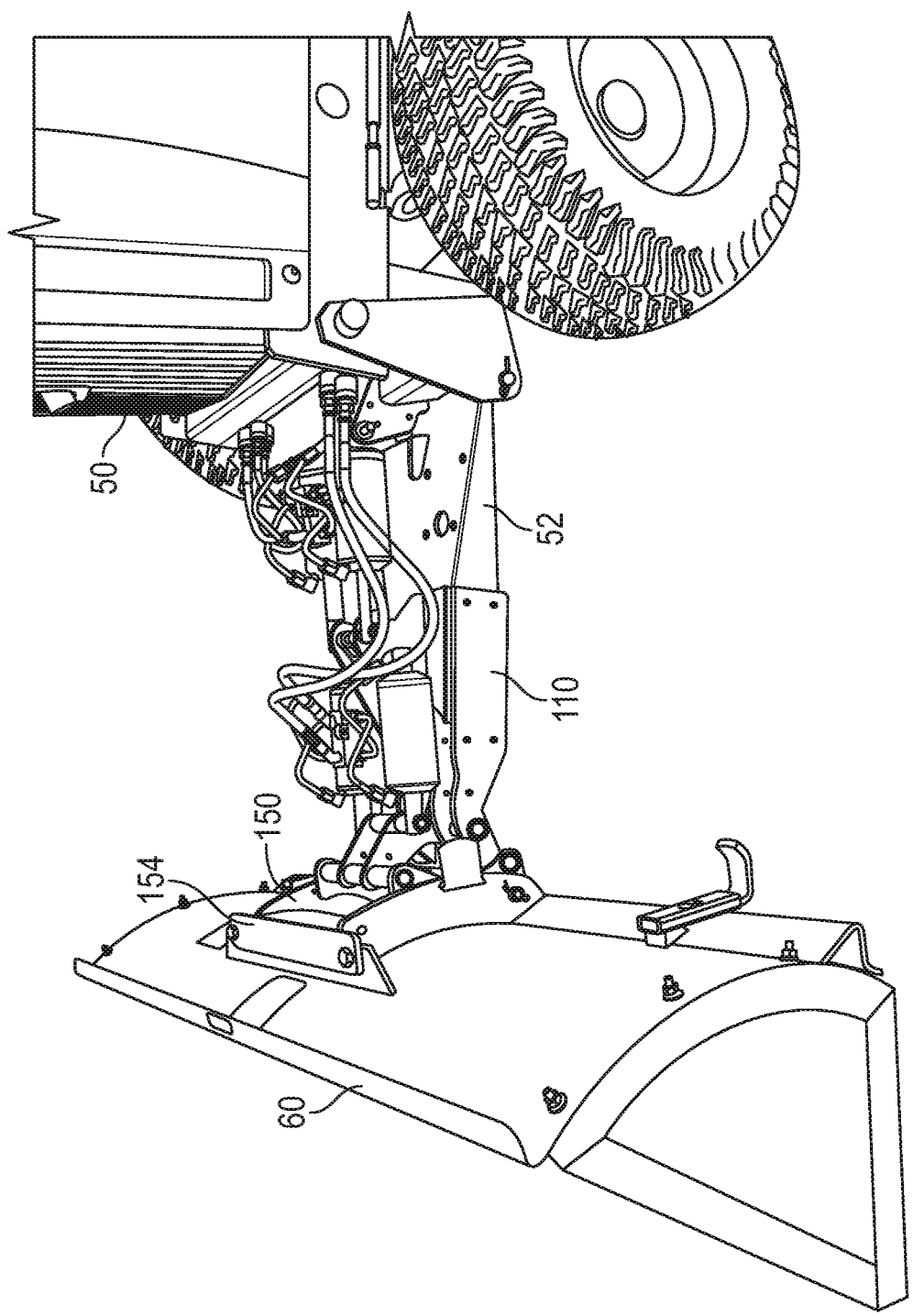
FIG. 2 is a side perspective view of the plow conversion kit mounted on the tractor, with the work piece shown in FIG. 2.

Work piece 60 is manipulated by hydraulically actuated cylinders connected to a frame between tractor 50 and workpiece 60. Although hydraulic actuators are shown, those skilled in the art will recognize that other types of linear actuators, such as electric linear actuators, can be used instead of or in combination with, hydraulic cylinders. Hydraulic lines are shown in FIGS. 1 and 2 but are omitted from the remainder of the drawings for clarity. The present invention provides a kit that can replace the frame and the hydraulic cylinders originally provided with tractor 50 with a frame and hydraulic cylinders that provide a greater range of motion than the original equipment manufacturer ("OEM") supplied frame, allowing work piece 60 to better perform.

Referring to FIGS. 1-9, a first exemplary embodiment of a plow conversion kit 100 ("kit 100") for a tractor 50 is shown. Tractor 50 can be a John Deere® tractor or other suitable tractor having a bracket 52 onto which kit 100 can be mounted. Alternatively, instead of a tractor, kit 100 can also be used on other types of vehicles, including, but not limited to trucks (both on- and off-highway), all-terrain vehicles, utility task vehicles, and other types of vehicles that can accommodate or be modified to accommodate kit 100.

Kit 100 includes a frame 110 that has a frame proximal end 112, a frame distal end 114, and a top surface 116 extending between proximal end 112 and distal end 114. Proximal end 112 of frame 110 also includes a box channel 128 that is adapted to slide over bracket 52. After sliding frame 110 over bracket 52, frame 110 can be releasably secured to bracket 52 via nuts and bolts (not shown). Frame 110 is bisected by a vertical plane P that is shown in FIG. 1 as coming out of the plane of the paper of FIG. 1.

Figure 3:
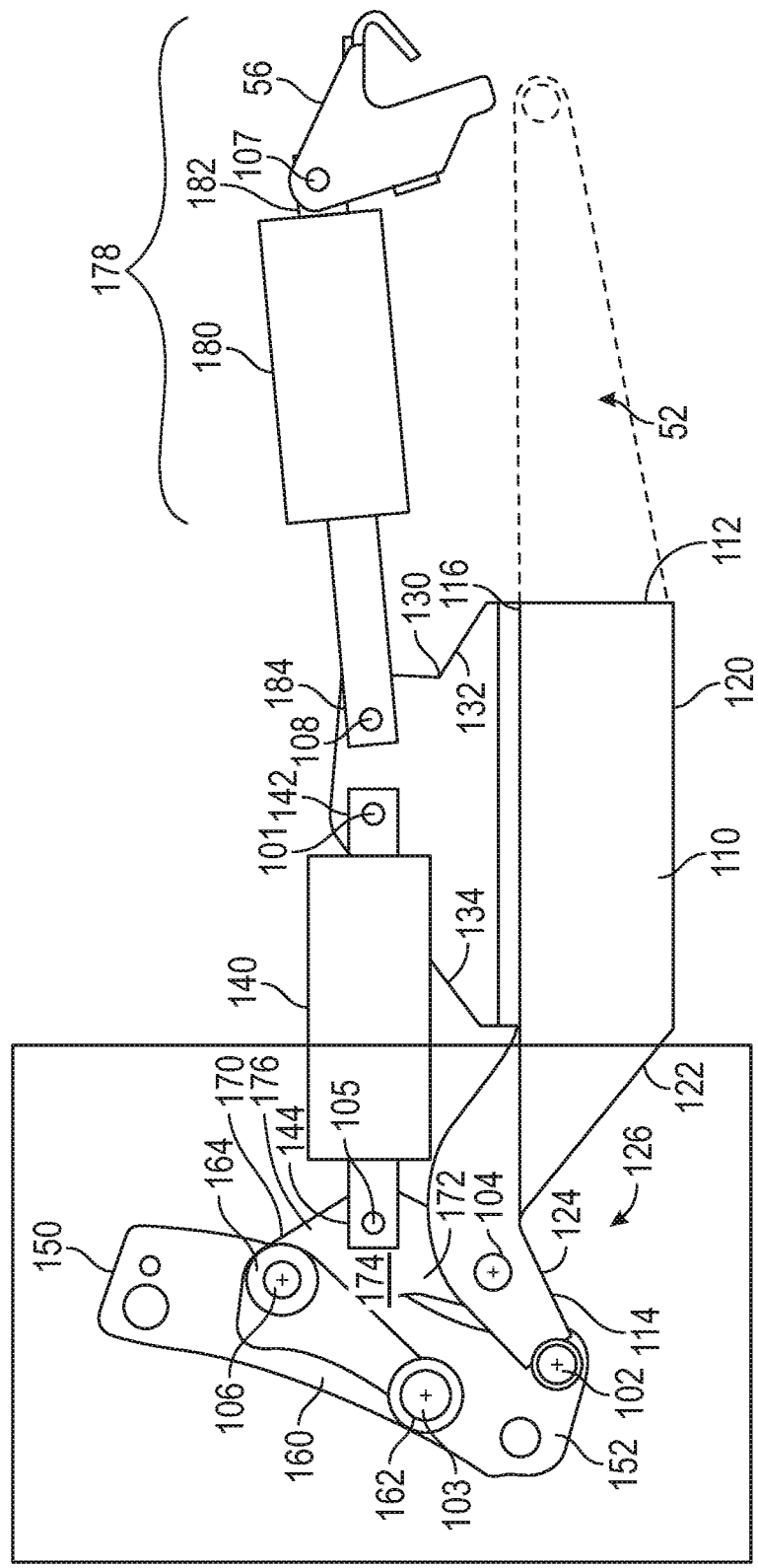
FIG. 3 is a side elevational view of the plow conversion kit shown in FIG. 2, with the work piece removed.
Figure 4:
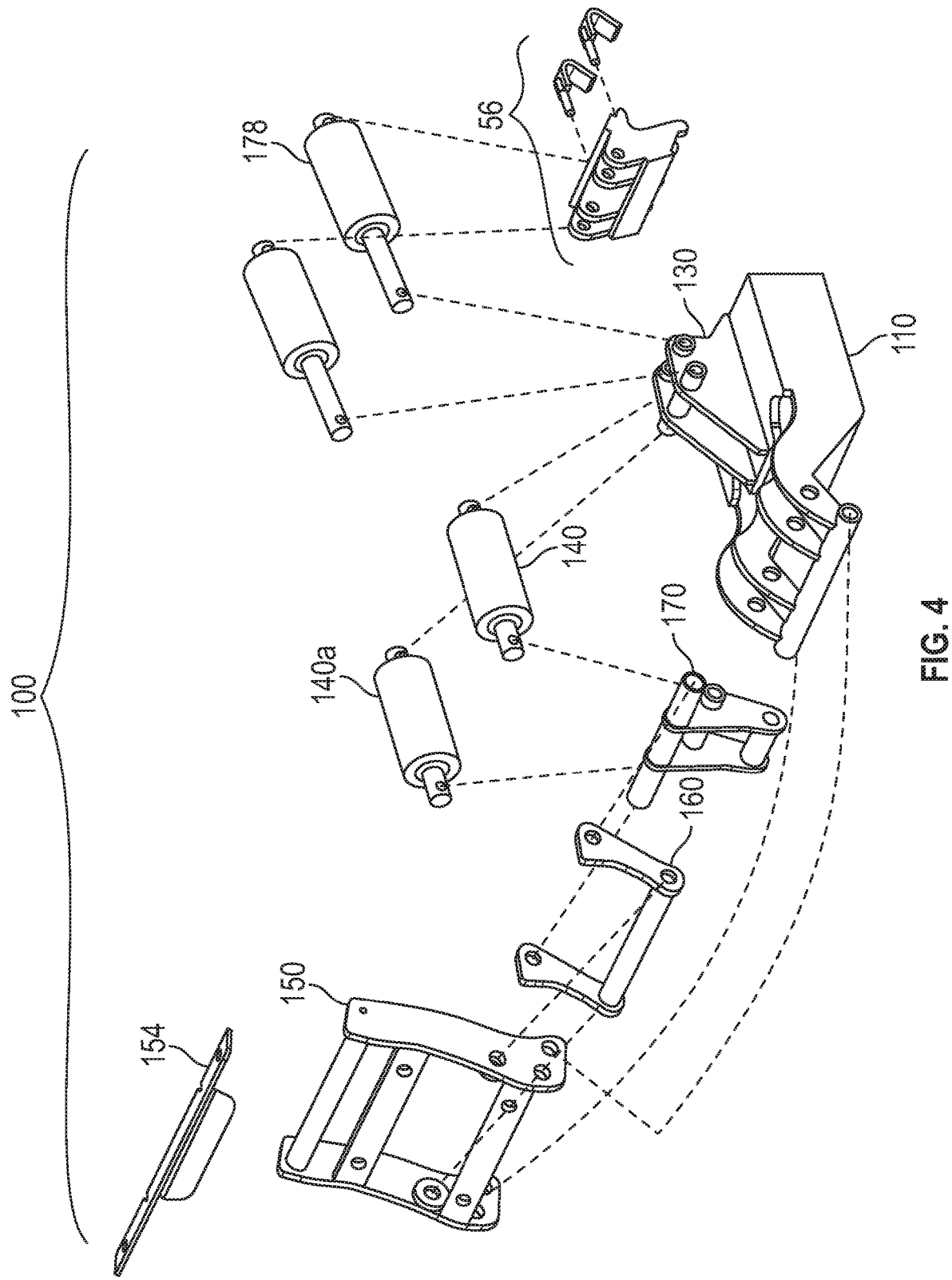
FIG. 4 is an exploded view of the plow conversion kit shown in FIG. 1.
Figure 5:
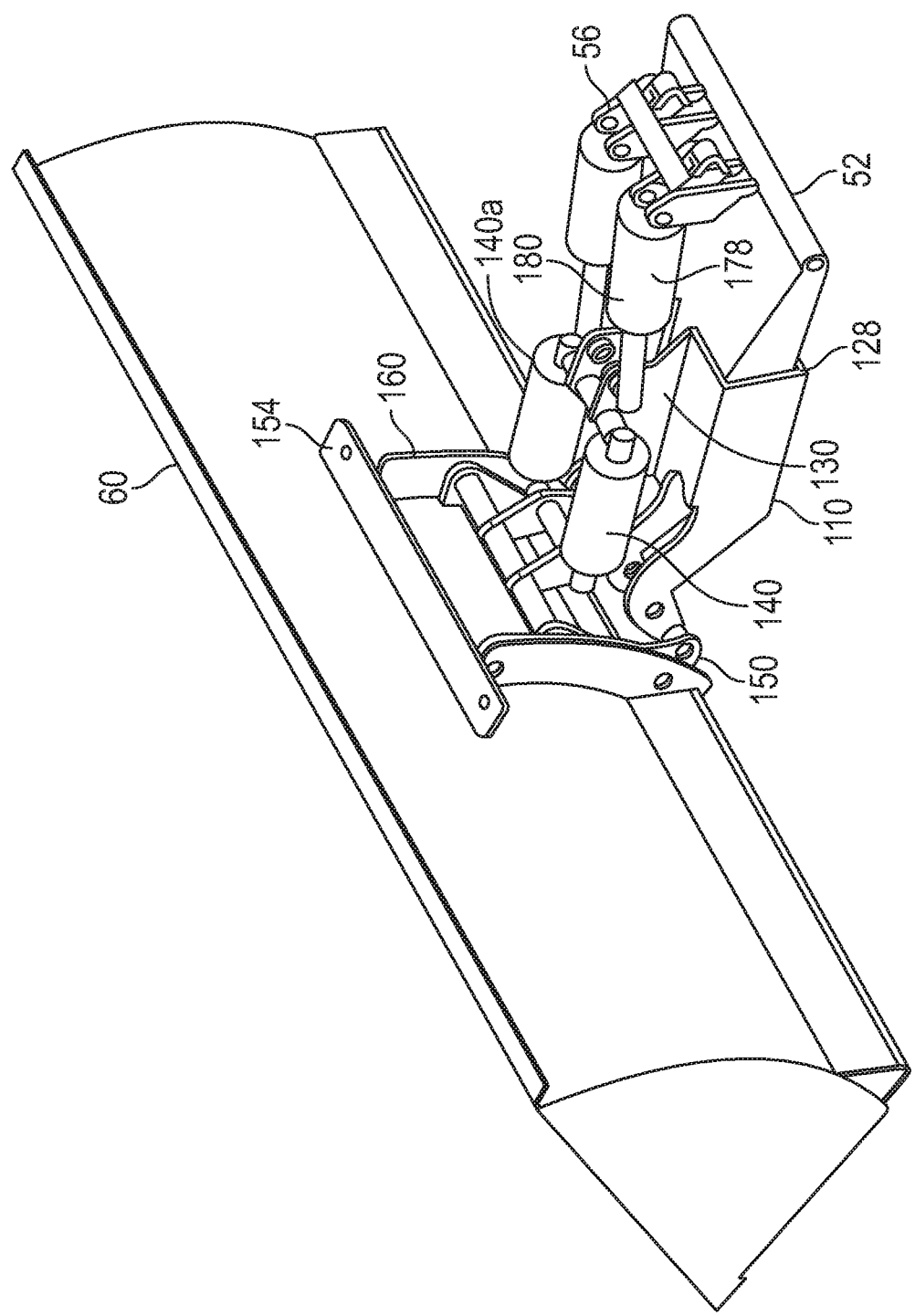
FIG. 5 is a rear perspective view of the plow conversion kit shown in FIG. 2, with the work piece attached.

Frame 110 also includes a lower surface 120 extending in a horizontal plane as shown in FIG. 3. A central surface 122 extends distally from lower surface 120 in an upwardly extending plane from lower surface 120. A distal surface 124 extends distally from central surface 122 in a downwardly extending plane from central surface 122 such that central surface 122 and distal surface 124 together define a distal concave cavity 126

A fixed bracket 130 is fixed to top surface 116 of frame 110. Fixed bracket 130 has a fixed bracket proximal end 132 and a fixed bracket distal end 134. Fixed bracket 130 can be integrally formed with frame 110 or can be a separate piece that is welded or otherwise fixedly connected to frame 110. Fixed bracket 130 extends along either side of plane P.

A first hydraulic cylinder 140 having a first cylinder proximal end 142 is pivotally connected to fixed bracket 130 at a first pivot 101 and a first cylinder distal end 144 extending distally of fixed bracket 130. While a single hydraulic cylinder 140 is shown in FIG. 3, referring to FIG. 1, hydraulic cylinder 140 can be used in parallel with a hydraulic cylinder 140a to provide additional power and control to the user. Hydraulic cylinder 140 is located on a first side of vertical plane P, while hydraulic cylinder 140a is on an opposing side of plane P. For simplicity, however, only the first side of plane P will be discussed.

Referring back to FIG. 2, a mounting bracket 150 is adapted to releasably attach to work piece 60. Mounting bracket 150 has a lower end 152 pivotally connected to distal end 114 of frame 110 at a second pivot 102. In an exemplary embodiment, second pivot 102 extends about 15 inches from proximal end 112 of frame 110 and about ¾ inch below top surface 116 of frame 110. Mounting bracket 150 includes an upper flange 154 that is adapted to engage work piece 60 to releasably secure work piece 60 to mounting bracket 150.

Extension and retraction of hydraulic cylinder 140 pivots mounting bracket 150 about second pivot 102 to adjust the operation of work piece 60. If work piece 60 is a bucket, extension of hydraulic cylinder 140 tips the bucket to dump out the bucket. If work piece 60 is a plow, extension or retraction of hydraulic cylinder 140 adjusts the attack angle of the plow with respect to a ground surface. Different types of surfaces, such as gravel or asphalt, as well as snow/ice conditions, require different attack angles.

Referring to FIG. 3, a mount arm 160 has a lower end 162 pivotally connected to mounting bracket 150 at a third pivot 103 above second pivot 102. In an exemplary embodiment, when first hydraulic cylinder 140 is fully contracted, third pivot 103 extends distally of second pivot 102 and also extends about 15¾ inches from proximal end 112 of frame 110 and about 2 inches above top surface 116 of frame 110. Mount arm 160 also has an upper portion 164.

A pivot bracket 170 is located proximally of mount arm 160. Pivot bracket 170 has a lower end 172 pivotally connected to frame distal end 114 at a fourth pivot 104, a central portion 174 pivotally connected to first cylinder distal end 144 at a fifth pivot 105, and a top end 176 that is connectable to upper portion 164 of mount arm 160 at a sixth pivot 106. In an exemplary embodiment, when first hydraulic cylinder 140 is fully contracted, sixth pivot 106 extends about 13½ inches from proximal end 112 of frame 110 and about 5⅓ inches above top surface 116 of frame 110.

In an exemplary embodiment, fourth pivot 104 extends about 13½ inches from proximal end 112 of frame 110 and about ½ inch above top surface 116 of frame 100. Pivot bracket 170 is attached to frame 110 proximally of the attachment of mounting bracket 150 to frame 110.

Optionally, a second hydraulic cylinder assembly 178 can be used. Second hydraulic cylinder assembly 178 includes a second hydraulic cylinder 180 and a tractor mount 56. Second hydraulic cylinder assembly 178 is located proximally of first hydraulic cylinder 140 and is releasably attachable to tractor 150.

Second hydraulic cylinder 180 has a second proximal end 182 pivotally connected to tractor mount 56 at a seventh pivot 107 and a second distal end 184 pivotally connected to fixed bracket 130 at an eighth pivot 108. Eighth pivot 108 is located proximally of first pivot 101.

Kit 100 provides a greater range of motion than prior mounting kits. For example, when second hydraulic cylinder 180 is distally extended, frame 110 has a pivot, or "frame lift" angle of greater than 50 degrees, as shown in FIG. 6A. Additionally, when first hydraulic cylinder 140 is extended, at least a portion of mounting bracket 150 and work piece 60 extend into concave cavity 126, resulting in mounting bracket 150 and work piece 60 having a pivot angle of over 150 degrees, as shown in FIG. 6B.

Figure 7:
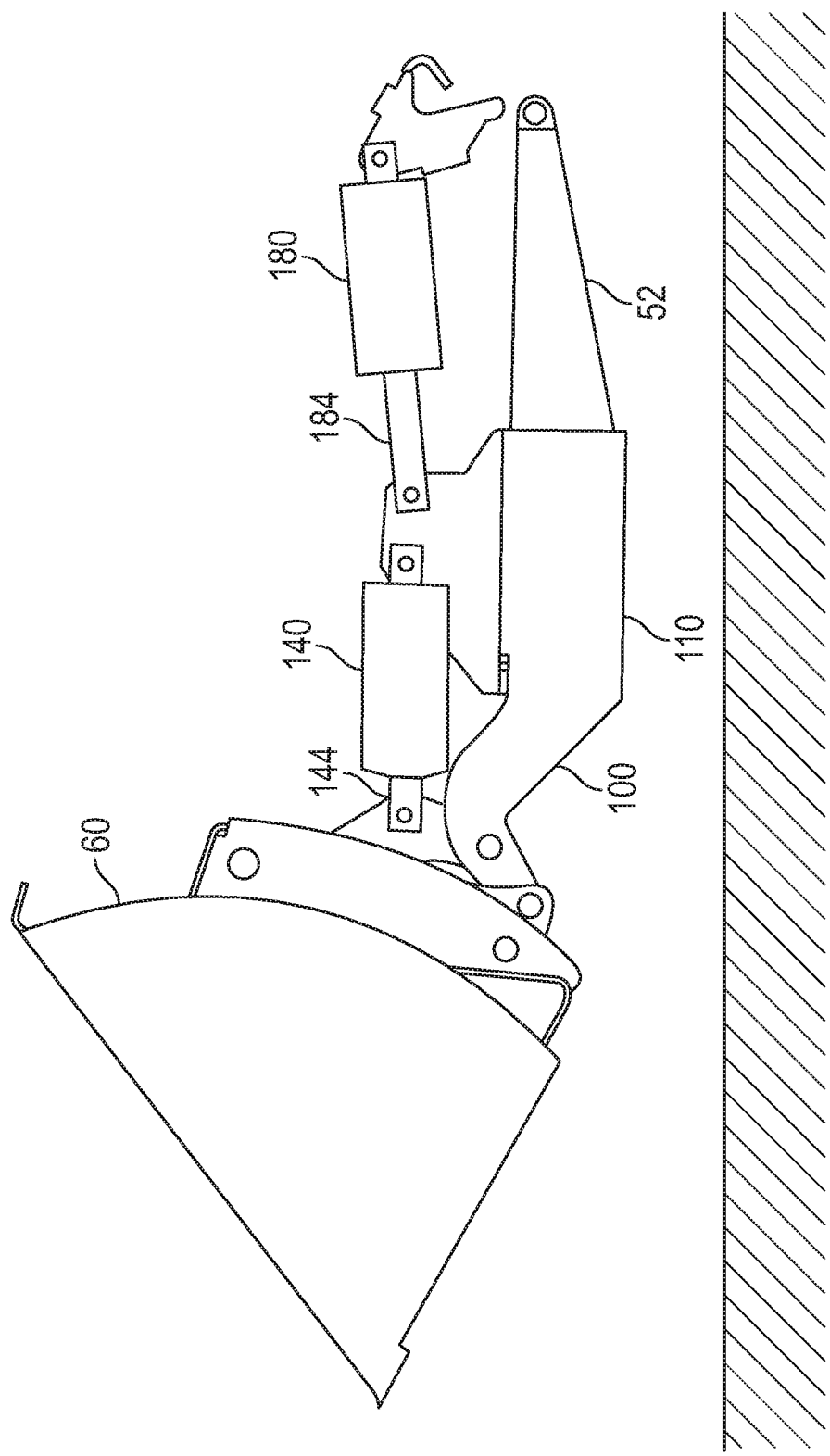
FIG. 7 is a side elevational view of the plow conversion kit shown in FIG. 2, with the work piece attached, showing the frame in a neutral position and the work piece in a back position.
Figure 8:
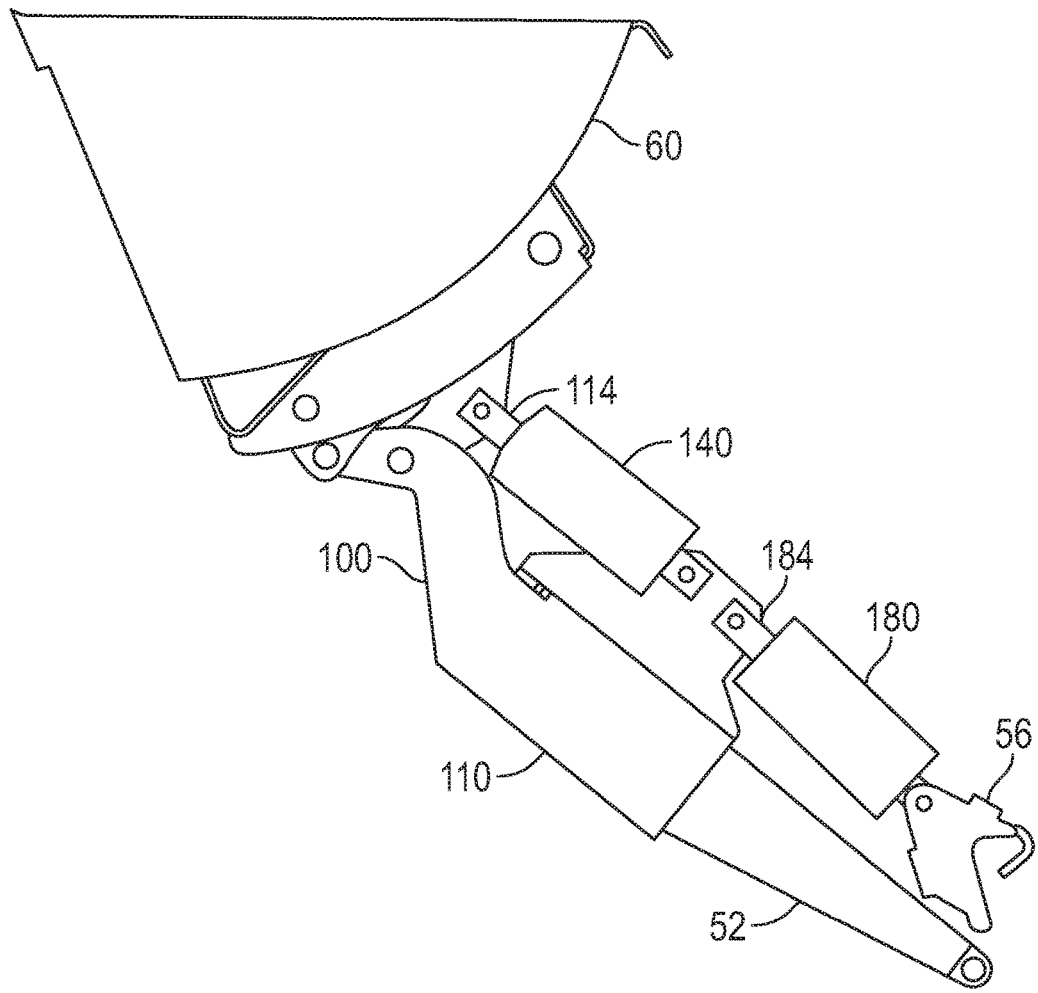
FIG. 8 is a side elevational view of the plow conversion kit shown in FIG. 2, with the work piece attached, showing the frame in a lift position and the work piece in a back position.
Figure 9:
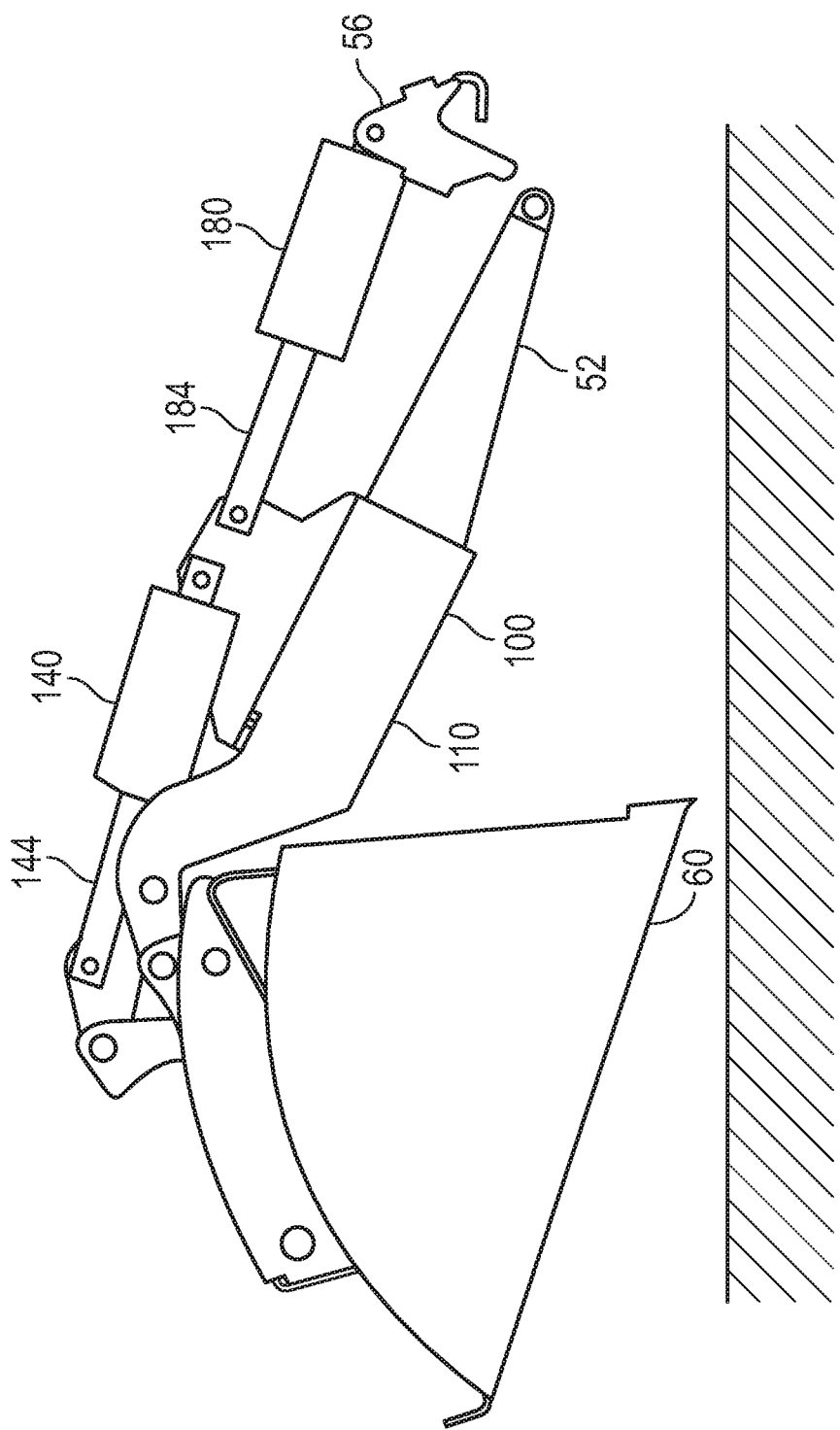
FIG. 9 is a side elevational view of the plow conversion kit shown in FIG. 2, with the work piece attached, showing the frame in a down position and the work piece in a dump position.

FIGS. 7-9 show kit 100 on a tractor 50 in a variety of positions. In FIG. 7, frame 110 is in a neutral position relative to ground G (generally parallel to ground G) with work piece 60 pulled back to retain dirt, debris or other matter within work piece 60. Frame 110 is in the neutral position by extending second distal end 184 of second hydraulic cylinder 180 a little more than half of its length from the body of second hydraulic cylinder 180. Work piece 60 is pulled back by contracting first distal end 144 of first hydraulic cylinder 140 into a retracted position.

In FIG. 8, frame 110 is in an up position relative to ground G with work piece 60 pulled back to retain dirt, debris or other matter within work piece 60. Frame 110 is pivoted upward by contracting second distal end 184 of second hydraulic cylinder 180 into a retracted position. Work piece 60 is pulled back by contracting first distal end 144 of first hydraulic cylinder 140 into a retracted position.

In FIG. 9, frame 110 is in a down position relative to ground G with work piece 60 pushed forward to dump dirt, debris or other matter within work piece 60. Frame 110 is pivoted downward by extending second distal end 184 of second hydraulic cylinder 180 its entire extendable length. Work piece 60 is pushed downward by extending first distal end 144 of first hydraulic cylinder 140 its entire extendable length.

Figure 10:
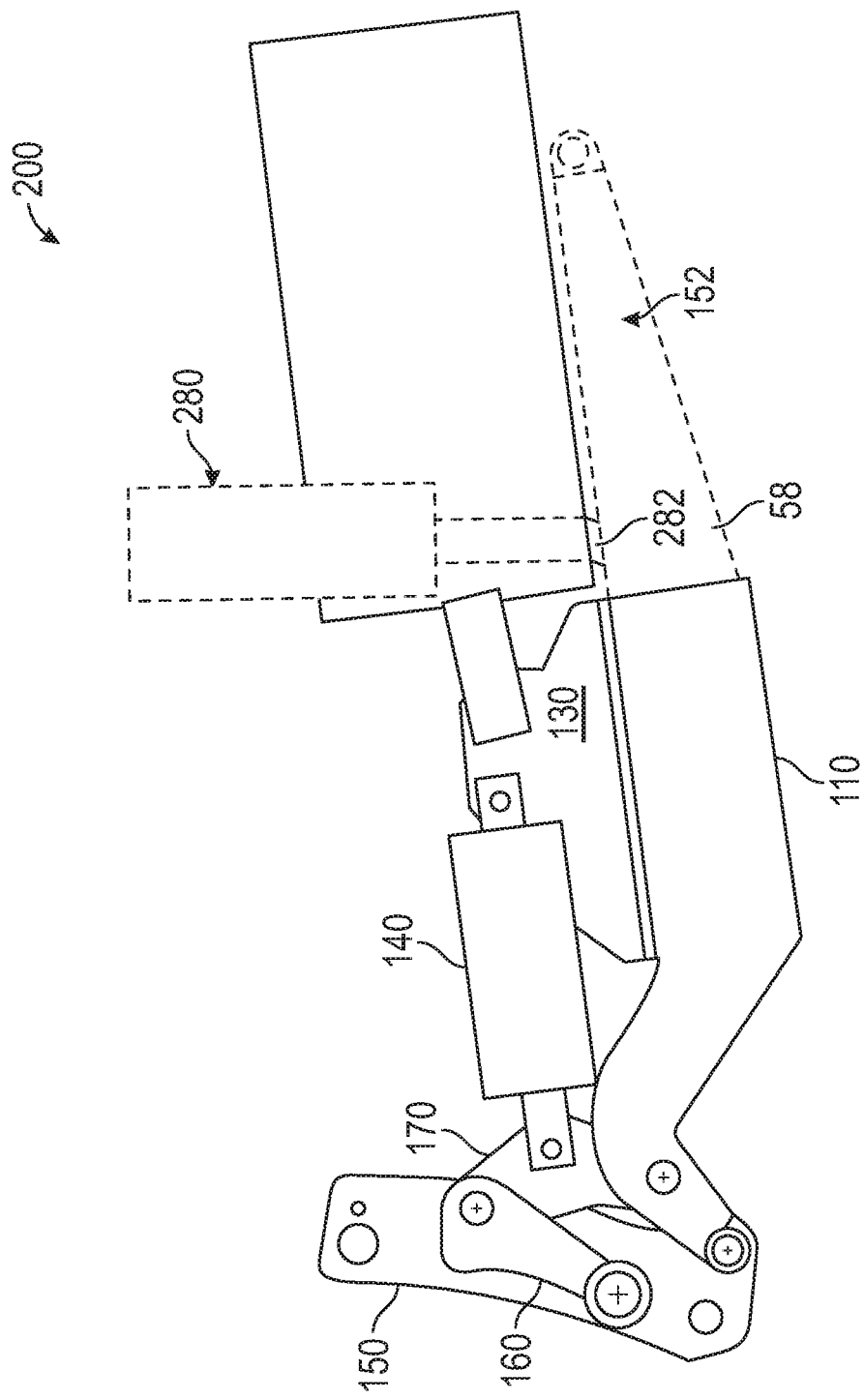
FIG. 10 is a sided elevational view of a plow conversion kit according to a second embodiment of the present invention.
Figure 11:
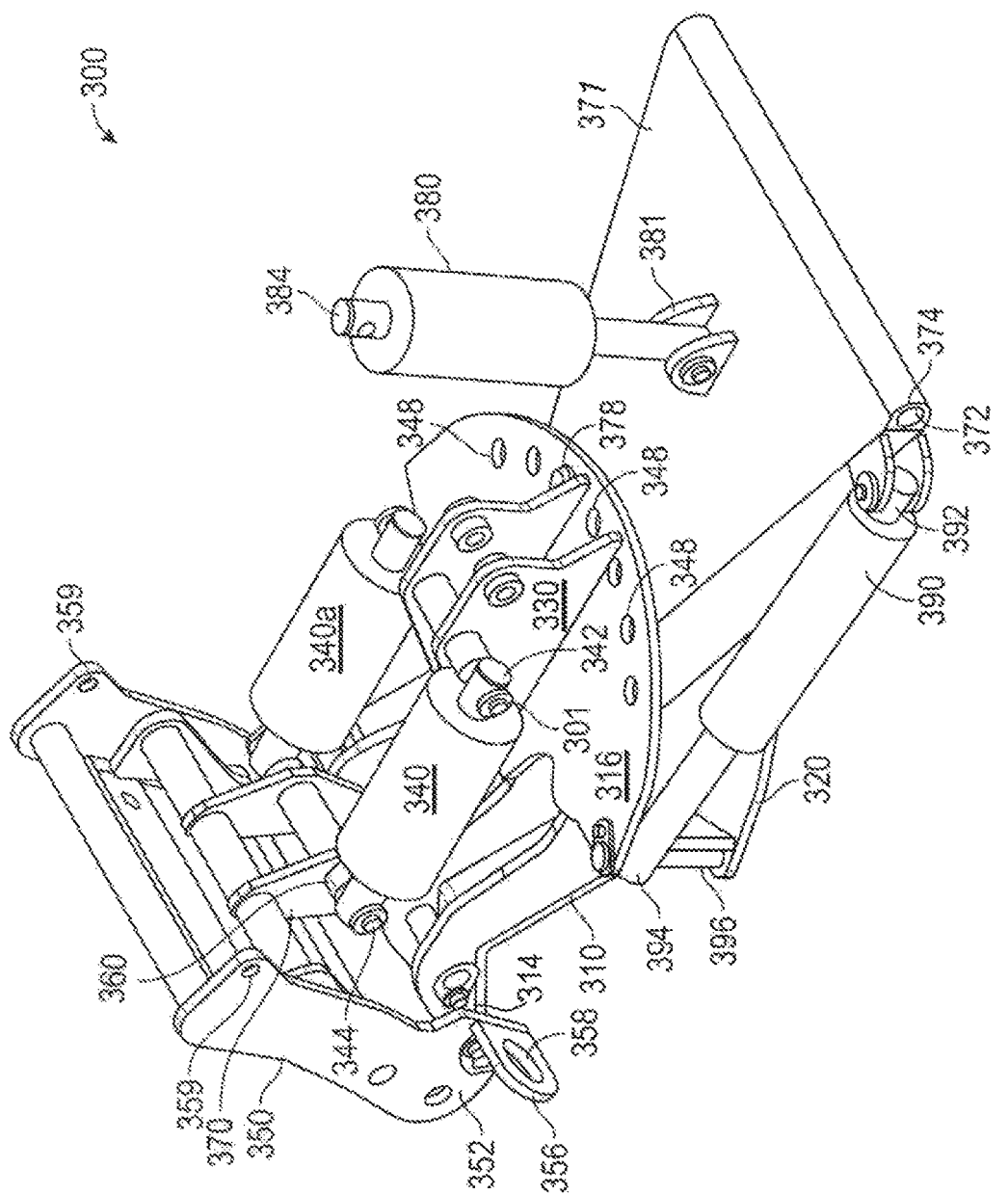
FIG. 11 is a rear perspective view of a plow conversion kit according to an alternative exemplary embodiment of the present invention.
Figure 12:
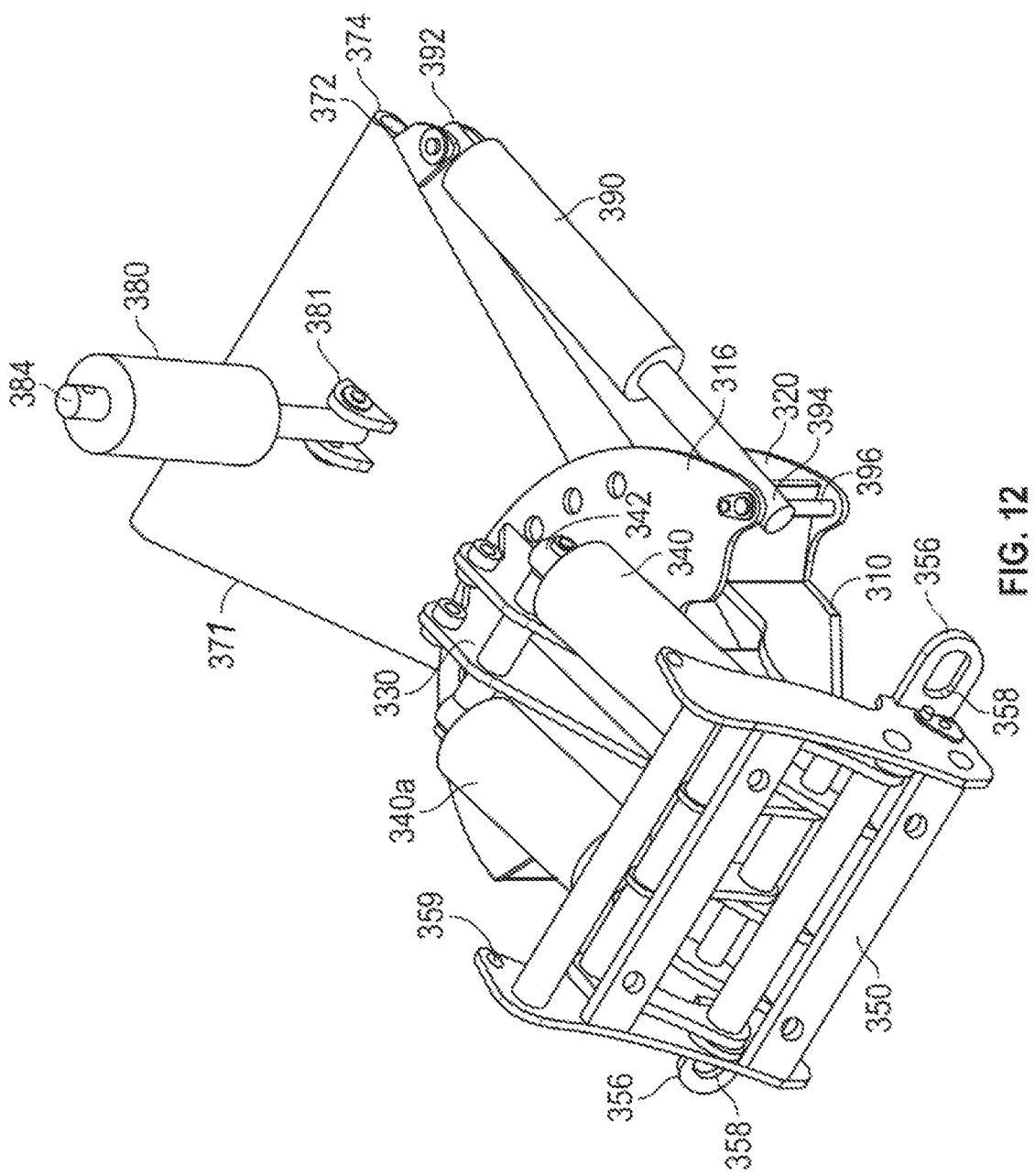
FIG. 12 is a front perspective view of the plow conversion kit shown in FIG. 11.

FIG. 10 shows a plow conversion kit 200 according to an alternative embodiment of the present invention. Kit 100 is similar to kit 100, but has eliminated second hydraulic actuator 180, which may be OEM provided. In the configuration shown in FIG. 10, OEM hydraulic cylinder 280 extends generally vertically and has a distal end 282 that is connected to a distal end 58 of plow bracket 52. When distal end 282 is in an extended position, as shown in FIG. 10, kit 200 is tilted downward. When distal end 282 is contracted into cylinder 280, kit 200 is tilted upward.

Other operations of kit 200 are similar to those described above with respect to kit 100.

An alternative embodiment of a kit 300 is shown in FIGS. 11-15. Kit 300 includes a frame 310 with a fixed bracket 330 fixed to a top surface 316 of frame 310. Top surface 316 extends in a horizontal plane. Fixed bracket 330 can be integrally formed with frame 310 or can be a separate piece that is welded or otherwise fixedly connected to frame 310.

A first hydraulic cylinder 340 having a first cylinder proximal end 342 is pivotally connected to fixed bracket 330 at a first pivot 301 and a first cylinder distal end 344 extending distally of fixed bracket 330 and connected to a pivot bracket 370. Hydraulic cylinder 340 can be used in parallel with a hydraulic cylinder 340a to provide additional power and control to the user. Hydraulic cylinder 340 is located on a first side of a vertical plane P3, while hydraulic cylinder 340a is on an opposing side of plane P3. For simplicity, however, only the first side of plane P3 will be discussed.

A mounting bracket 350 is adapted to releasably attach to work piece 60 (shown in FIG. 2). A mount arm 360 is pivotally connected to mounting bracket 350. Mounting bracket 350 has a lower end 352 pivotally connected to distal end 314 of frame 310 at a second pivot 302. In an exemplary embodiment, second pivot 302 extends about 15 inches from proximal end 312 of frame 310 and about ¾ inch below top surface 316 of frame 310. Mounting bracket 350 includes an upper flange 354 that is adapted to engage work piece 60 to releasably secure work piece 60 to mounting bracket 350.

Mounting bracket 350 also includes ears 356 mounted on either side of mounting bracket 350, distal from plane P3. Ears 356 include through openings 358 extending therethrough that can be used to attach one end of a spring (not shown). A second end of the spring can be attached to workpiece 60 (such as a plow) to reduce or prevent damage to workpiece 60 if workpiece 60 encounters an obstacle, which is common in plow systems.

Additionally, mounting bracket 350 includes through openings 359 on either side thereof, distal from plane P3. Through openings 359 allow for the insertion of a clevis pin or other hardware (not shown) therethrough, as well as through a corresponding through opening on work piece 60 to fixedly secure work piece 60 to mounting bracket 350 and prevent work piece 60 from tripping forward.

Frame 310 is pivotally attached to a pivot plate 371 that can be releasably and pivotally attached to a vehicle, such as a truck, a plow or other similar type of vehicle. Pivot plate 371 has a proximal end 372 having a through passage 374 extending transversely therethrough. Through passage 374 is sized to accept a pin (not shown) that can be inserted into receivers (not shown) on either end of through passage 374 so that pivot plate 371 can pivot up or down along plane P3. A linear actuator 380 has a lower end 381 pivotally connected to pivot plate 371 and an upper end 384 that is connectable to a vehicle 50 such that, when linear actuator 380 extends, pivot plate 371 pivots to lower mounting bracket 350 and, when linear actuator 380 contracts, pivot plate 371 pivots to raise mounting bracket 350.

A pivot pin 382, located along plane P3, extends through top surface 316 of frame 310, such that top surface 316 rotates above pivot plate 371, and pivot pin 382 extends through top surface 316, through pivot plate 371, and through a lower surface 320 of frame 310. Lower surface 320 extends in a plane parallel to the plane of top surface 316. A linear actuator 390 has a proximal end 392 pivotally attached to pivot plate 371 along one side of pivot plate 371, distal from plane P3. Linear actuator 390 has a distal end 394 pivotally attached to a pin 396 that extends between top surface 316 and lower surface 320 on the same side of frame 310 as proximal end 392. As linear actuator 390 extends/retracts distal end 394, frame 310 rotates about pin 396. In an exemplary embodiment, when distal end 394 is fully retracted, frame 310 is rotated about 45 degrees to the left relative to plane P3 and when distal end 394 is fully extended, frame 310 is rotated about 45 degrees to the right relative to plane P3 (when viewed from proximal end 392 of linear actuator 390).

Top surface 316 includes a plurality of through holes 348 extending radially along a proximal perimeter of top surface 316. Lower surface 320 has a corresponding plurality of vertically aligned through holes (not shown). Pivot plate 371 includes a through slot sized to accept a securing member in the form of a bolt 378 that can be inserted through one of through holes 348, the through slot, and through the corresponding through hole in lower surface 320 to fixedly restrain frame 310 from rotating relative to pivot plate 371.

Figure 13:
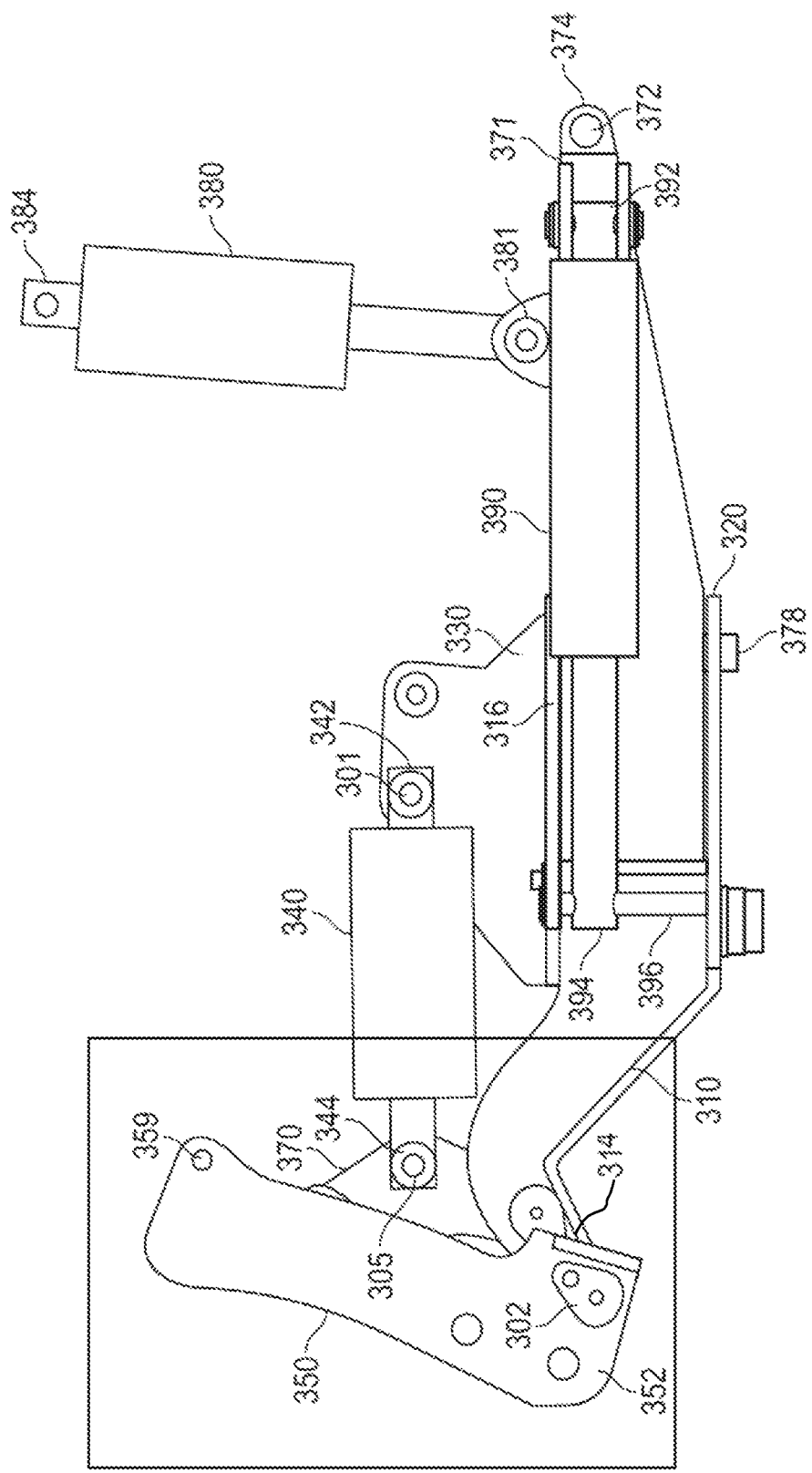
FIG. 13 is a side elevational view of the plow conversion kit shown in FIG. 11.
Figure 14:
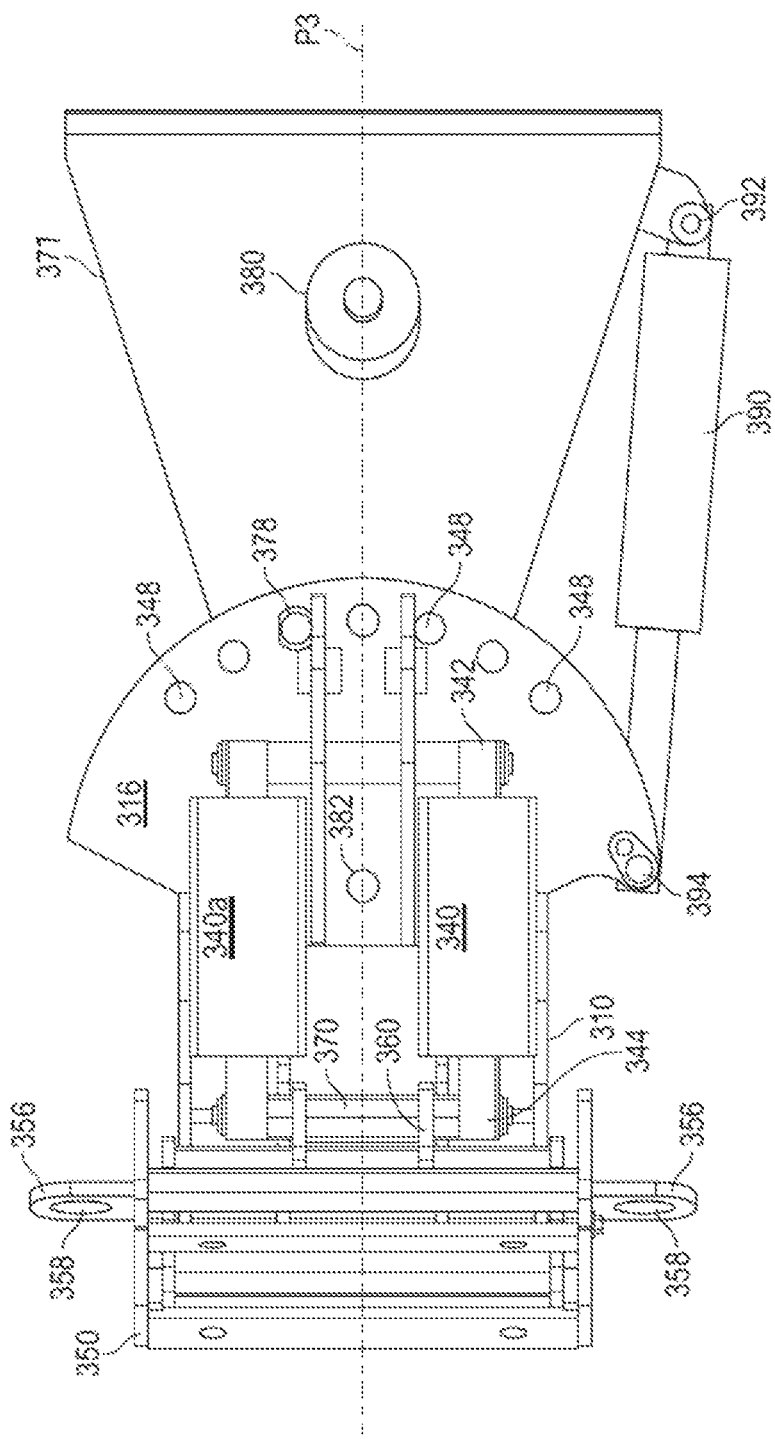
FIG. 14 is a top plan view of the plow conversion kit shown in FIG. 11.
Figure 15:
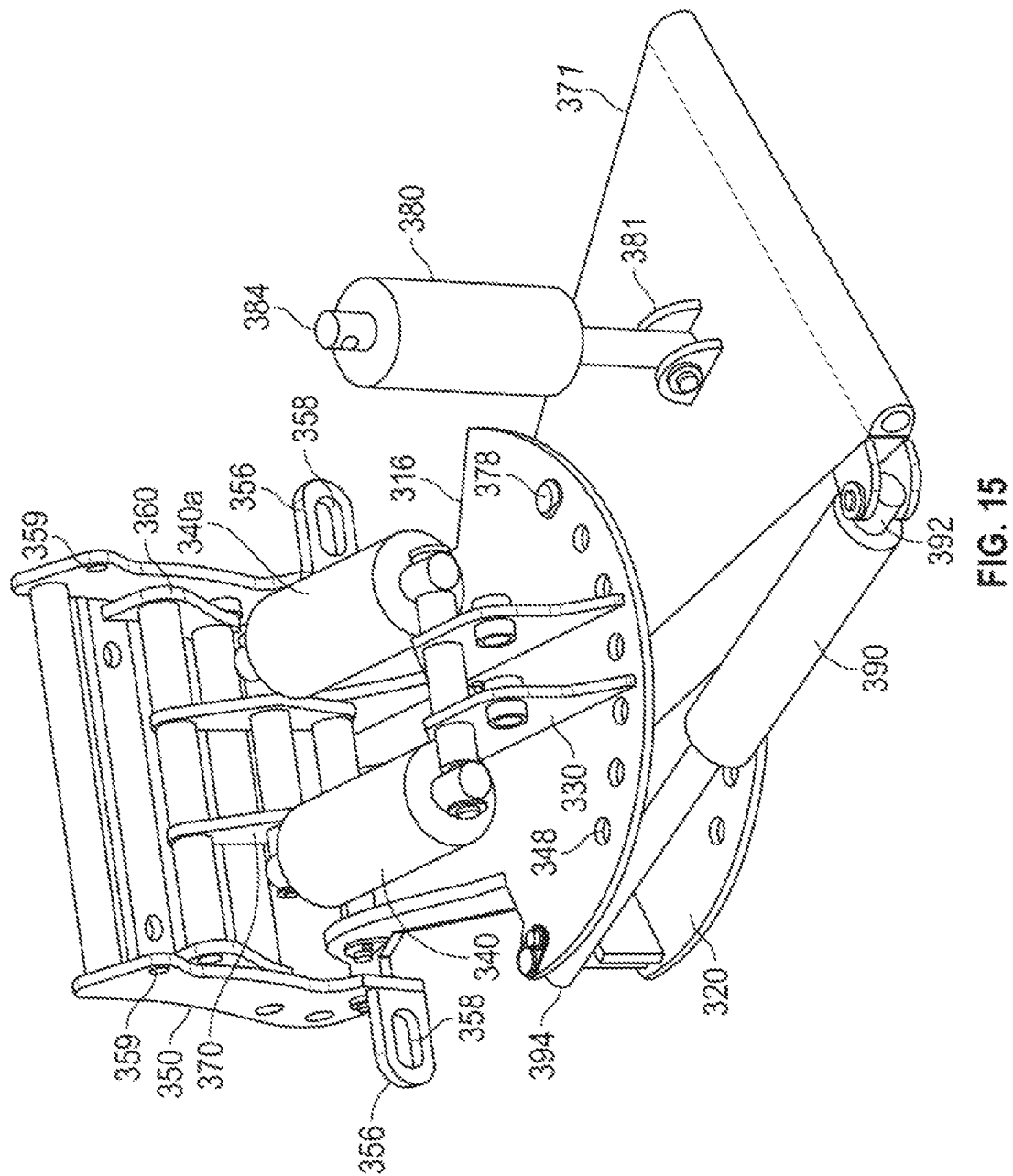
FIG. 15 is a rear perspective view of the plow conversion kit shown in FIG. 11, with the frame rotated relative to a pivot plate.
Figure 16:
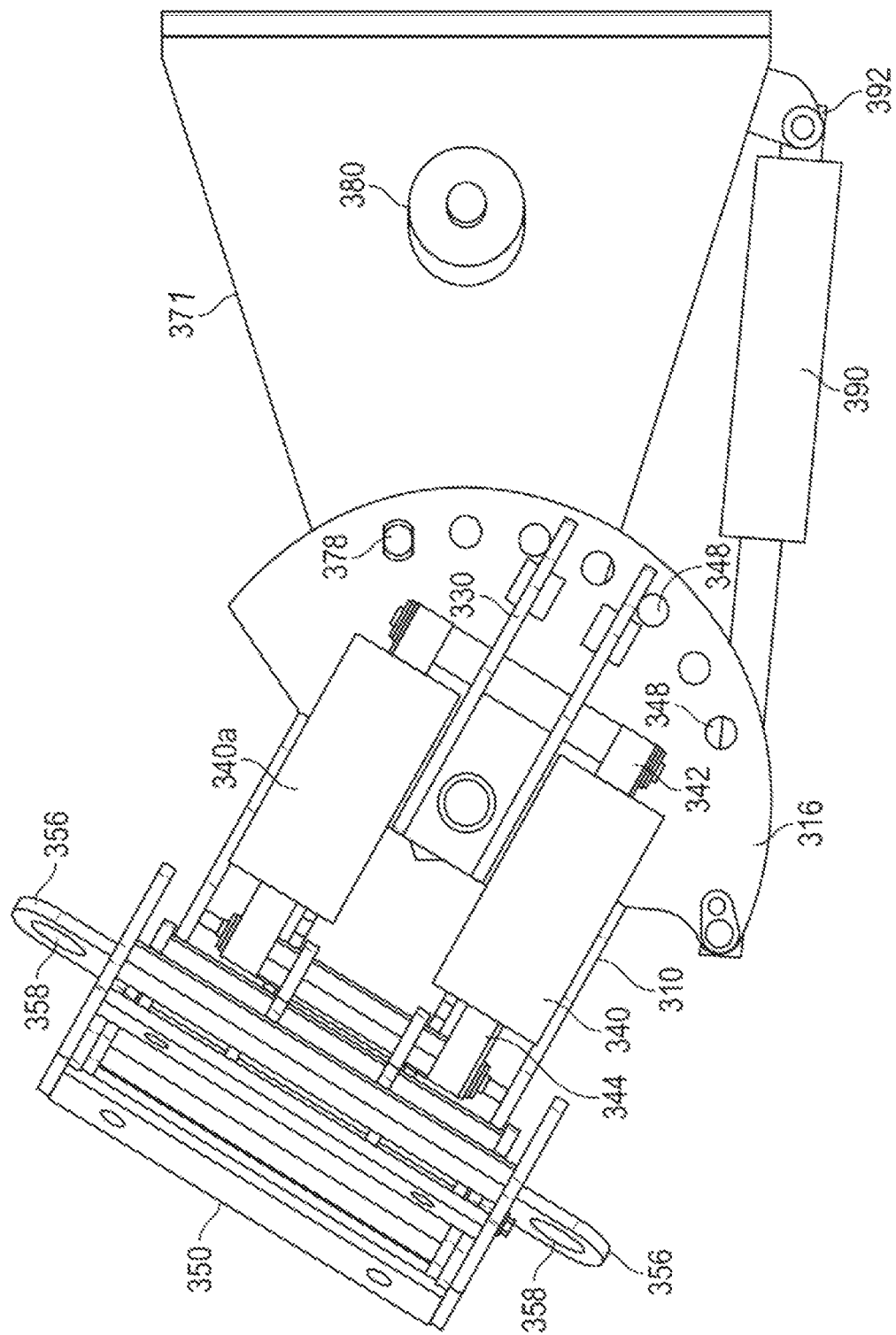
FIG. 16 is a top plan view of the plow conversion kit shown in FIG. 15.

Referring specifically to the box on the left side of FIG. 13, the remaining pivot points are the same pivot points as described above with respect to the pivot points in the box of FIG. 3 and need not be repeated.

It will be further understood that various changes in the details, materials, and arrangements of the parts which have been described and illustrated to explain the nature of this invention may be made by those skilled in the art without departing from the scope of the invention as expressed in the following claims.

I claim:

1. A plow conversion kit for a vehicle comprising:
   a frame having a frame proximal end, a frame distal end, and a top surface extending between the proximal end and the distal end;
   a pivot plate configured to be releasably connected to a vehicle such that the proximal end of the frame is rotatably connected to the pivot plate;
   a fixed bracket directly fixed to the top surface of the frame, the fixed bracket having a fixed bracket proximal end and a fixed bracket distal end;
   an actively extendible first actuator having a first actuator proximal end pivotally directly connected to the fixed bracket and a first actuator distal end extending distally of the fixed bracket at a first pivot; and
   a mounting bracket adapted to releasably attach to a work piece, the mounting bracket having a lower end directly pivotally connected to the frame distal end;
   a mount arm directly pivotally connected to the mounting bracket; and
   a pivot bracket having a lower end directly pivotally connected to the frame distal end at a second pivot, a central portion directly pivotally connected to the first actuator distal end at the first pivot, and a top end directly pivotally connected to the mount arm such that the first actuator is controllably extendible to pivot the mounting bracket a determined amount.

2. The plow conversion kit according to claim 1, wherein the frame comprises a top surface extending in a horizontal plane and a lower surface extending parallel to the top surface, such that at least a portion of the pivot plate is disposed between the top surface and the lower surface.

3. The plow conversion kit according to claim 1, further comprising an actuator having a first end connected to the pivot plate and a second end connected to the frame such that actuation of the actuator rotates the frame relative to the pivot plate.

4. The plow conversion kit according to claim 1, wherein the frame comprises a plurality of radially spaced through holes and wherein the pivot plate comprises a slot such that, when one of the plurality of through holes is aligned with the slot, a securing member extends through the through hole and into the slot, fixedly connecting the frame to the pivot plate.

5. The plow conversion kit according to claim 1, wherein the pivot plate includes a passage extending transversely therethrough, such that the pivot plate is configured to pivot about a pin inserted into the passage.

6. The plow conversion kit according to claim 5, further comprising a pivot plate actuator having a bottom end connected to the pivot plate, such that actuation of the pivot plate actuator pivots the pivot plate.

7. The plow conversion kit according to claim 1, wherein the mounting bracket comprises an ear extending outwardly therefrom, wherein the ear has an opening extending therethrough.

8. The plow conversion kit according to claim 1, wherein a top end of the mounting bracket has a through opening extending therethrough, such that the through opening is configured to accept a piece of hardware to fixedly secure the work piece to the mounting bracket.

9. A plow conversion kit comprising:
   a pivot plate configured to attach to a vehicle;
   a frame pivotally attached to the pivot plate;
   an actively extendible first actuator attached to the frame;
   a mounting bracket directly pivotally attached to a frame, the mounting bracket adapted to releasably attach to a work piece; and
   a pivot bracket having three pivot points:
      a first pivot point directly pivotally attached to the frame at a first pivot;
      a second pivot point directly attached to the first actuator at a second pivot; and
      a third pivot point directly attached to the mounting bracket;
   such that the first actuator can be extended a determined amount to pivot the mounting bracket through a determined angle.

10. The plow conversion kit according to claim 9, wherein the frame comprises a top surface extending in a horizontal plane and a lower surface extending parallel to the top surface, such that at least a portion of the pivot plate is disposed between the top surface and the lower surface.

11. The plow conversion kit according to claim 9, further comprising an actuator having a first end connected to the pivot plate and a second end connected to the frame such that actuation of the actuator rotates the frame relative to the pivot plate.

12. The plow conversion kit according to claim 9, wherein the frame comprises a plurality of radially spaced through holes and wherein the pivot plate comprises a slot such that, when one of the plurality of through holes is aligned with the slot, a securing member extends through the through hole and into the slot, fixedly connecting the frame to the pivot plate.

13. The plow conversion kit according to claim 9, wherein the pivot plate includes a passage extending transversely therethrough, such that the pivot plate is configured to pivot about a pin inserted into the passage.

14. The plow conversion kit according to claim 13, further comprising a pivot plate actuator having a bottom end connected to the pivot plate, such that actuation of the pivot plate actuator pivots the pivot plate.

15. The plow conversion kit according to claim 9, wherein the mounting bracket comprises an ear extending outwardly therefrom, wherein the ear has a opening extending therethrough.

16. The plow conversion kit according to claim 9, wherein a top end of the mounting plate has a through opening extending therethrough, such that the through opening is configured to accept a piece of hardware to fixedly secure the work piece to the mounting bracket.

17. A plow conversion kit comprising:
   a pivot plate configured to attach to a vehicle;
   a frame pivotally attached to the pivot plate;
   a pivot bracket directly pivotally attached to the frame at a first pivot;
   a first actuator having a first end connected to the pivot plate and a second end connected to the frame;
   a second actuator having a first end attached to the frame and a second end attached to the pivot bracket; and
   a mounting bracket directly pivotally attached to the frame and to the pivot bracket, the mounting bracket adapted to releasably attach to a work piece;
   wherein controlled extension and retraction of the first actuator controllably pivots the frame about the pivot plate, and
   wherein controlled extension and contraction of the second actuator controllably pivots the pivot bracket such that the pivot bracket controllably pivots the mounting bracket.

18. The plow conversion kit according to claim 17, wherein the frame comprises a top surface and a lower surface, wherein at least a portion of the pivot plate is located between the top surface and the lower surface.

19. The plow conversion kit according to claim 17, further comprising a second actuator having a first end connected to the pivot plate and a second end connected to the frame.

20. The plow conversion kit according to claim 17, further comprising a bolt configured to mechanically secure the pivot plate to the frame to prevent rotation of the frame relative to the pivot plate.

* * * * *